United States Patent [19]

Rego et al.

[11] Patent Number: 5,412,452
[45] Date of Patent: May 2, 1995

[54] APPARATUS AND METHOD FOR CONTROLLING DIAGNOSTIC ROUTINES CONCURRENTLY IN A PRINTING SYSTEM

[75] Inventors: James M. Rego; Robert S. Hamilton; Patricia A. Hannaway, all of Webster; James R. Reno, Walworth, all of N.Y.

[73] Assignee: Xerox Corporation, Stamford, Conn.

[21] Appl. No.: 169,455

[22] Filed: Dec. 20, 1993

[51] Int. Cl.$^6$ .............................................. G03G 21/00
[52] U.S. Cl. .................................. 355/203; 355/204; 355/205; 355/206; 355/207; 355/208; 364/267.4; 364/267.5; 371/16.4; 371/29.1
[58] Field of Search ............... 355/200, 202, 203–208; 371/16.4, 16.5, 18, 29.1; 364/267.4, 267.5, 266, 943.92

[56] References Cited

U.S. PATENT DOCUMENTS

| | | |
|---|---|---|
| 4,937,864 | 6/1990 | Caseiras et al. ............. 355/204 X |
| 5,010,551 | 4/1991 | Goldsmith et al. .............. 371/16.4 |
| 5,063,535 | 11/1991 | Jacobs et al. ............. 371/16.5 X |
| 5,084,875 | 1/1992 | Weinberger et al. ........ 371/16.4 X |
| 5,200,958 | 4/1993 | Hamilton et al. .............. 371/16.4 |
| 5,202,726 | 4/1993 | McCulley et al. .............. 355/206 |
| 5,210,571 | 5/1993 | Peloquin et al. ............... 355/203 |
| 5,218,406 | 6/1993 | Ebner .............................. 355/205 |
| 5,241,402 | 8/1993 | Aboujaoude et al. ........ 355/202 X |
| 5,243,382 | 9/1993 | Takano et al. ................... 355/207 |
| 5,291,244 | 3/1994 | Kajiwara et al. ............. 355/204 X |
| 5,305,056 | 4/1994 | Salgado et al. .............. 355/204 X |
| 5,305,199 | 4/1994 | LoBioudo et al. ............ 355/204 X |
| 5,325,156 | 6/1994 | Ulinski ........................ 371/16.4 X |

Primary Examiner—Matthew S. Smith
Attorney, Agent, or Firm—Gary B. Cohen

[57] ABSTRACT

There is provided a printing system with a first service and a second service. The first service and the second service are controlled by a system controller, and are activated selectively by the system controller in a first mode. The printing system includes a diagnostic subsystem including a first diagnostic routine for performing a diagnostic function relative to the first service and a second diagnostic routine for performing a diagnostic function relative to the second service. The printing system further includes a diagnostic system controller that communicates with the system controller and is activated selectively by the system controller in a second mode. The first diagnostic routine and the second diagnostic routine are activated, for concurrent operation thereof, when the diagnostic system controller determines that a preselected condition has been met.

23 Claims, 17 Drawing Sheets

APPARATUS AND METHOD FOR CONTROLLING DIAGNOSTIC ROUTINES CONCURRENTLY IN A PRINTING SYSTEM

The present invention relates generally to a technique for servicing a printing system and, more particularly, to an apparatus and method which permits multiple dialog clients to use multiple diagnostic programs concurrently.

As reproduction machines such as copiers and printers become more complex and versatile in the jobs which they can perform, the servicing of such reproduction machines also becomes more complex. These reproduction machines include numerous subcomponents, each of which contributes to some operation of the reproduction machine. In accordance with the types of operations preferably performed by a particular reproduction machine, the initial set-up of the machine varies. Accordingly, identical reproduction machines can initially be provided with widely varying set-up features.

Due to the complexity of the reproduction machine, numerous tasks are required of a service representative as machine malfunctions are diagnosed and corrected. Troubleshooting can involve numerous servicing procedures to isolate malfunctioning machine subcomponents. Service representatives must, therefore, keep track of servicing procedures previously performed in order to isolate the source of any machine malfunction.

In a number of known printing systems, diagnostic functions are executed serially. That is, a machine malfunction in one service, such as a scan service, is diagnosed prior to diagnosing a malfunction in another service, such as a print service. While at least one known printing machine, namely the DocuTech ® Network Publishing System performs certain diagnostic functions in parallel, the capability to perform a wide variety of diagnostic functions in parallel is limited since little management is provided for the subsystem which includes the diagnostic resources. For example, in the DocuTech ® Network Publishing System, certain "offline" diagnostics, such as "service call procedures" ("SCP") or "diagnostic ('dC') programs" can be performed concurrently with remote interactive communication ("RIC") operations. Such concurrent operation can, however, result in a conflict, which, due to lack of suitable management, is unresolvable.

An example of a printing system in which various diagnostic operations are performed serially can be found in the following patent, the pertinent portions of which are incorporated herein by reference:

U.S. Pat. No. 5,202,726

Patentees: McCulley et al.

Issued: Apr. 13, 1993

As illustrated in FIG. 8 of U.S. Pat No. 5,202,726, certain diagnostic functions, namely SCP and dC programs are accessed by transitioning from one state to another.

Classically, a significant number of diagnostic systems for printing systems have been implemented with an eye toward serial operation. Performing diagnostic operations, in serial, results in a methodical, linear approach which is appropriate, in a number of situations, for diagnosing a printing machine malfunction. In current models of printing machines, however, such an approach can impair the speed at which diagnostics or related operations can be performed. For example, in certain known current printing machine models, the performance of various "set-up" operations, such as document registration, scanner calibration and image output terminal calibration, may be required whenever the service representative services a machine. An inability to perform such set-up operations in parallel can add to the amount of service time required significantly. Additionally, in serially-based diagnostic systems, the diagnosis of various services cannot be performed in parallel even though the operation of such services is mutually exclusive. That is, a diagnostic function cannot be performed relative to the scan service without disabling the ability to perform a diagnostic function relative to the print service. It would be desirable to provide a printing system in which multiple diagnostic functions could be, under suitably managed circumstances, performed in parallel.

A significant number of printing machines are not adapted to be diagnosed by a plurality of clients. One reason for this situation arises from the use of a design in which a plurality of diagnostic routines are corresponded with a single diagnostic first party client with little or no management. Accordingly, the diagnostic routines are linked integrally with the single first party diagnostic client. Adding a third party diagnostic client to this type of diagnostic system, requires that the third party diagnostic client be corresponded with the diagnostic routines to the same degree that the first party diagnostic client is corresponded with the diagnostic routines. In other words, the amount of programming required to correspond the third party diagnostic client with the diagnostic routines is no less than the amount of programming required to correspond the first party diagnostic client with the diagnostic routines. It would be desirable to provide a diagnostic system in which multiple diagnostic routines function as part of a diagnostic utility for one or more diagnostic clients so that the diagnostic system can be scaled readily, relative to both diagnostic clients and diagnostic routines, with a minimum amount of programming steps.

in accordance with one aspect of the present invention there is provided a printing system with a first service and a second service, the first service and the second service being controlled by a system controller, the first service and the second service being activated selectively by the system controller in a first mode, including: a diagnostic subsystem including a first diagnostic routine for performing a diagnostic function relative to the first service and a second diagnostic routine for performing a diagnostic function relative to the second service; and a diagnostic system controller, communicating with the system controller and being activated selectively by the system controller in a second mode, the first diagnostic routine and the second diagnostic routine being activated, for concurrent operation thereof, when the diagnostic system controller determines that a preselected condition has been met.

In another aspect of the present invention there is provided a control system for a diagnosing one or more malfunctions occurring within a printing system, including: a diagnostic system including a first diagnostic routine for performing a diagnostic function relative to the first service and a second diagnostic routine for performing a diagnostic function relative to the second service; a diagnostic system controller being operatively coupled with the first diagnostic routine and the second diagnostic routine; and a first diagnostic client and a second diagnostic client, the first diagnostic client and the second diagnostic client being operatively coupled with the diagnostic system controller, the diagnostic system controller causing the first diagnostic client and the second diagnostic client to communicate concurrently with the first diagnostic routine and the second diagnostic routine when a preselected condition has been met.

These and other aspects of the invention will become apparent from the following description, the description being used to illustrate a preferred embodiment of the invention when read in conjunction with the accompanying drawings.

Figure 1:
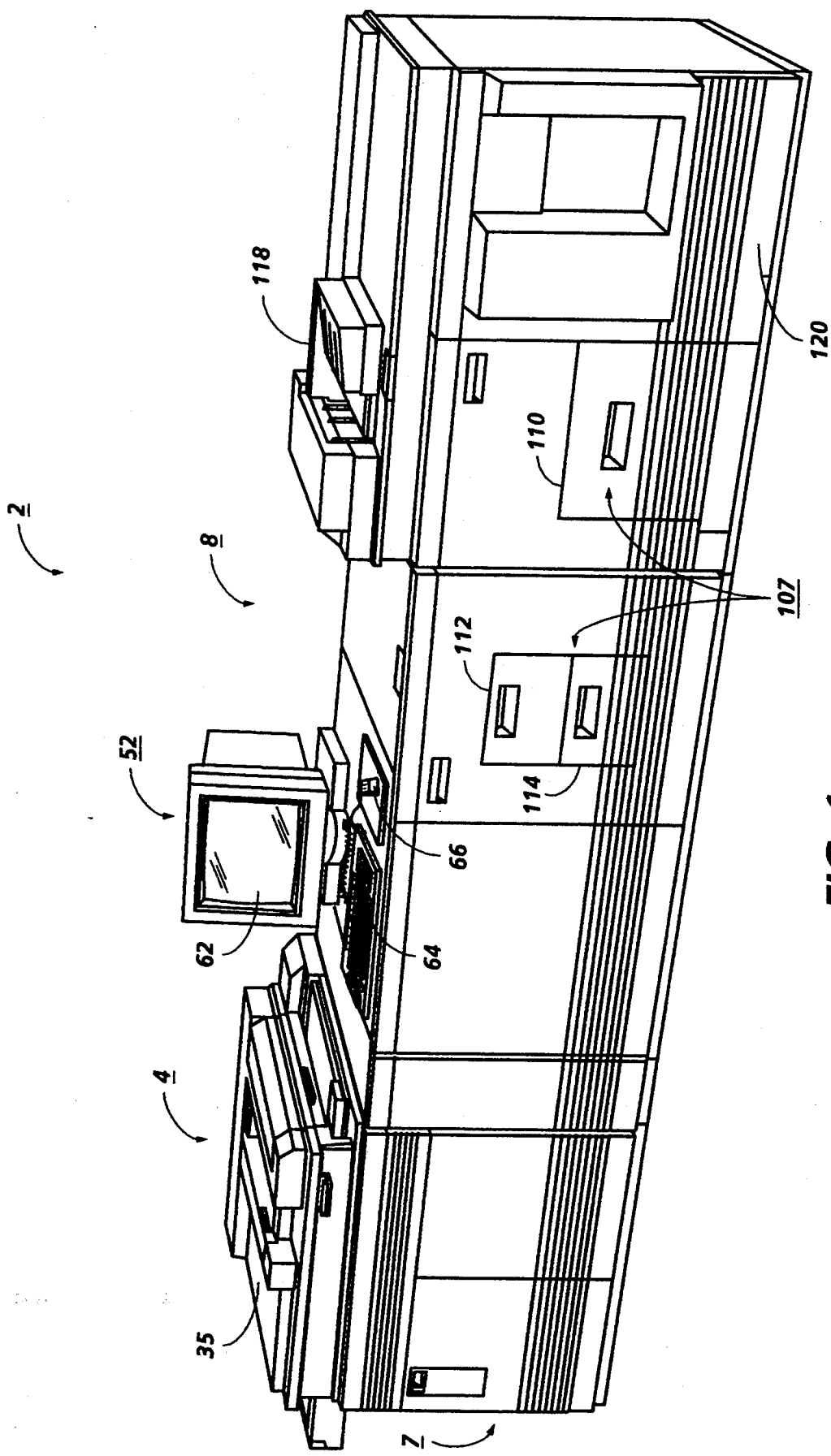
FIG. 1 is a view depicting an electronic printing system capable of employing a diagnostic control system of the present invention.
Figure 3:
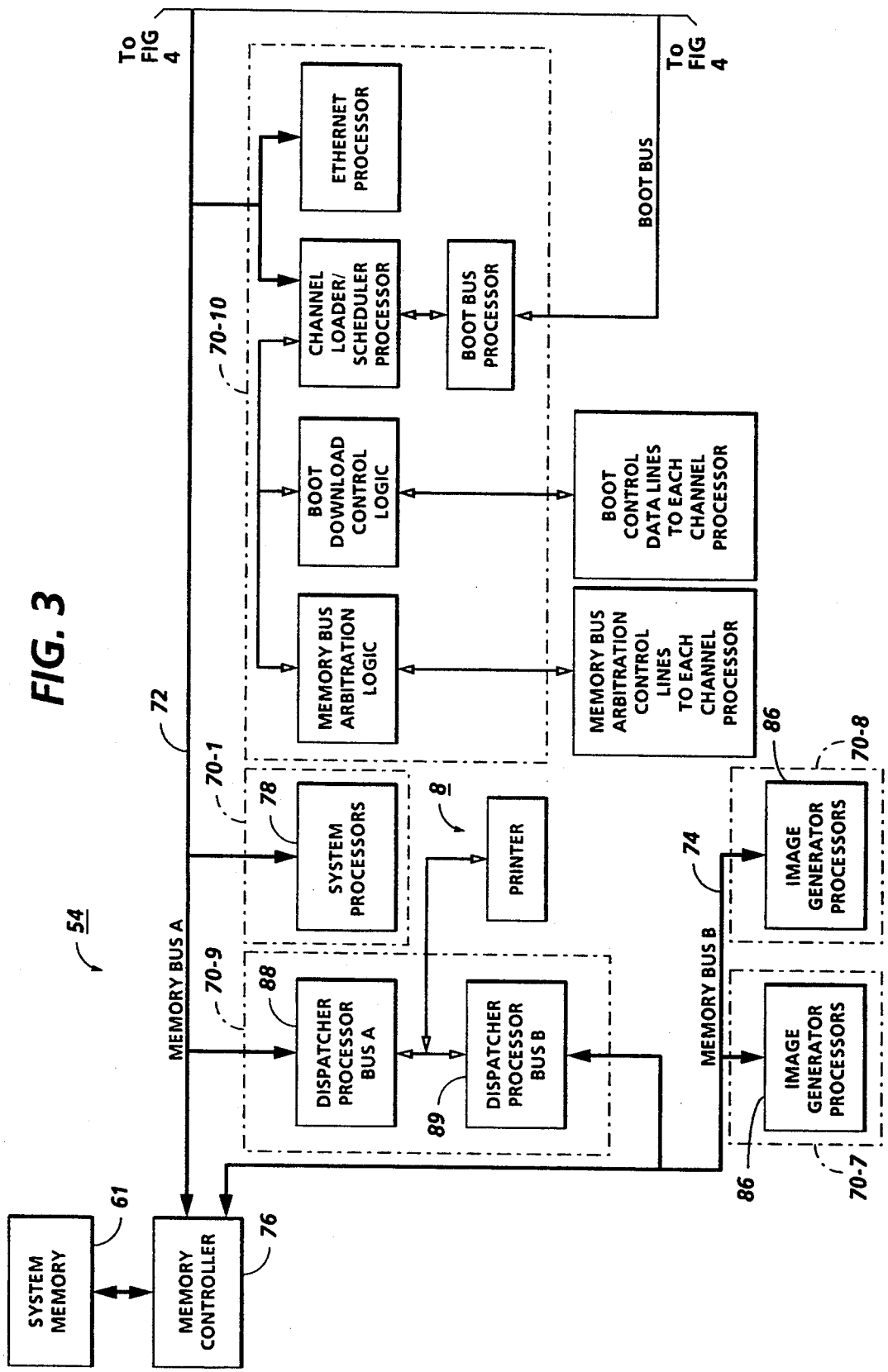
Figure 4:
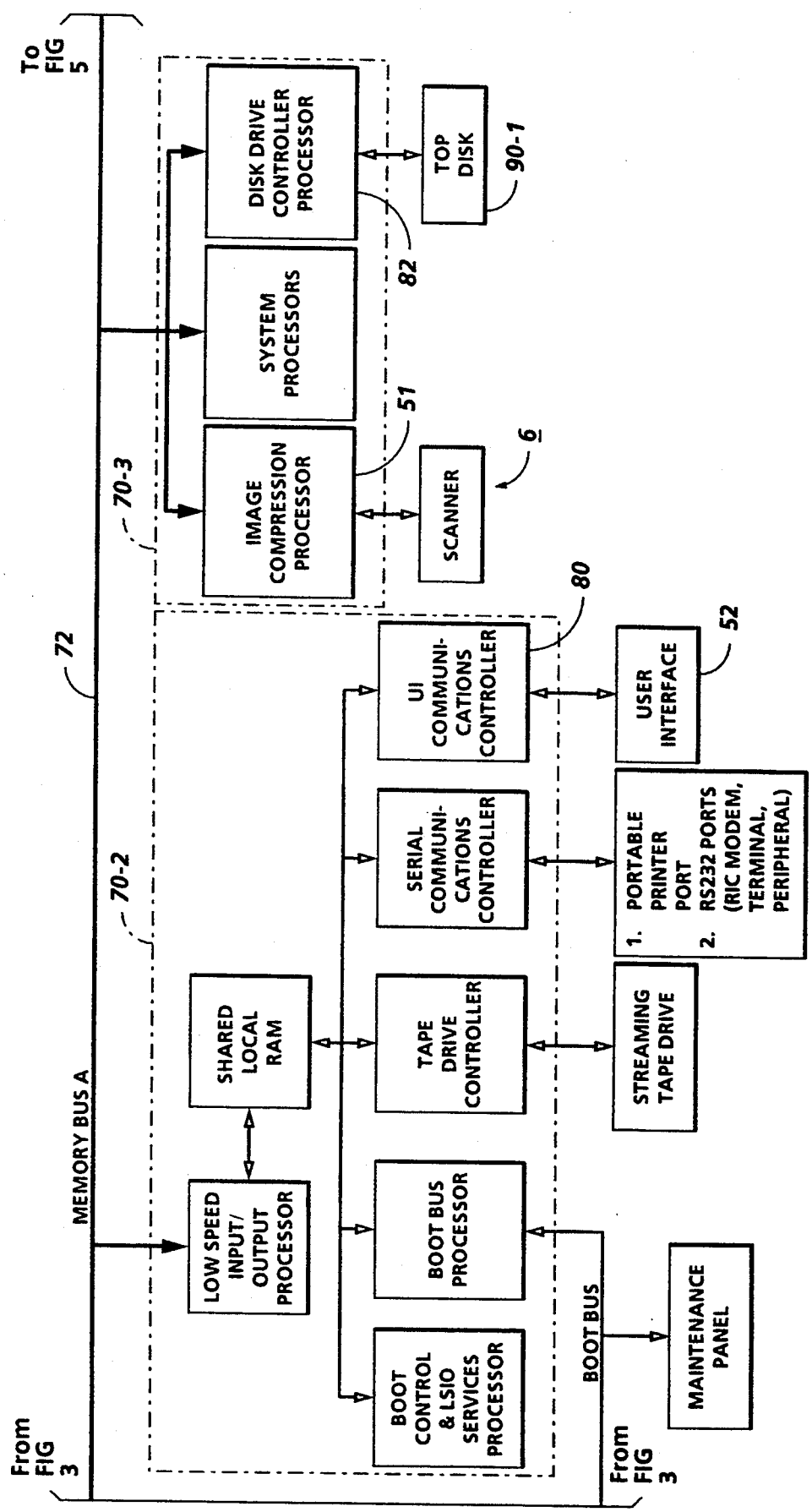
Figure 5:
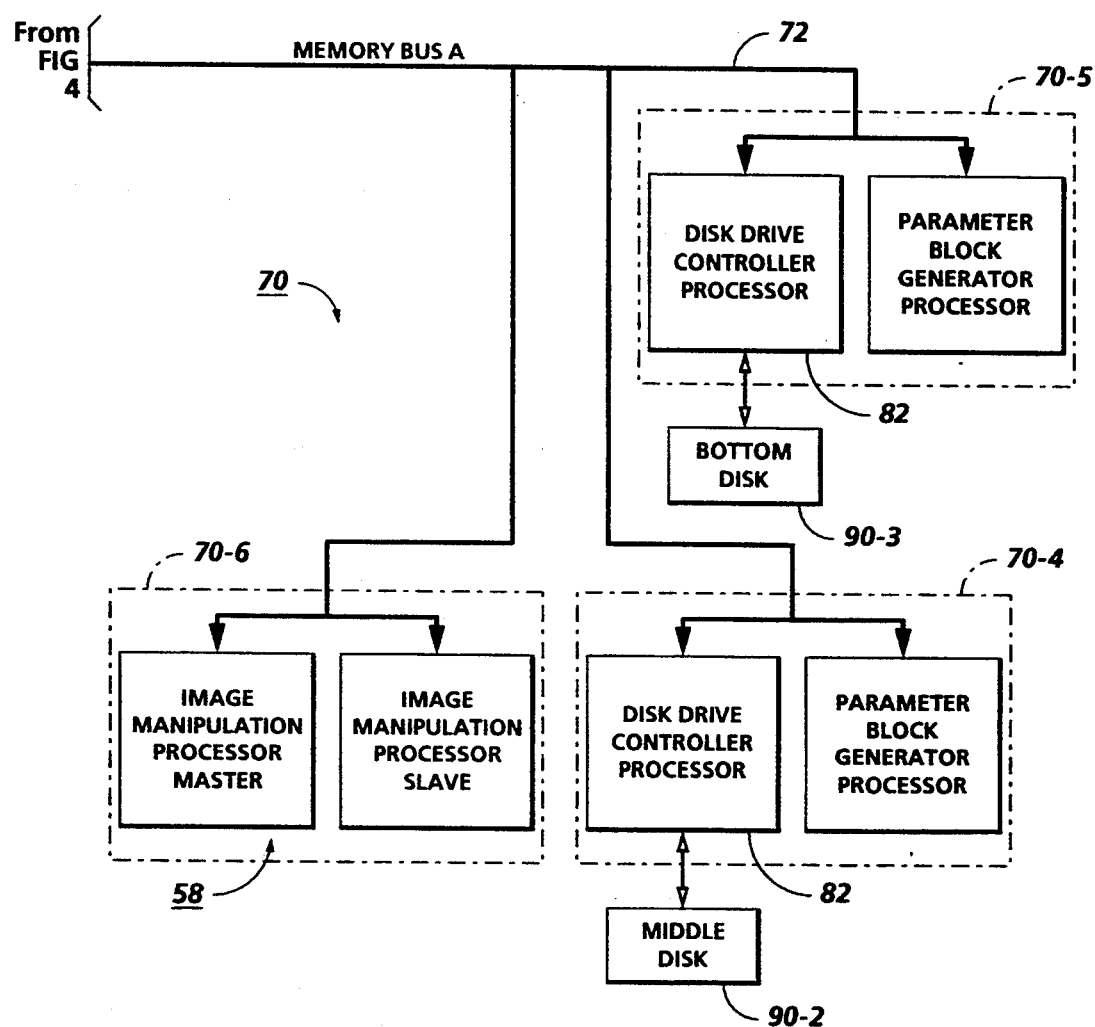
Figure 6:
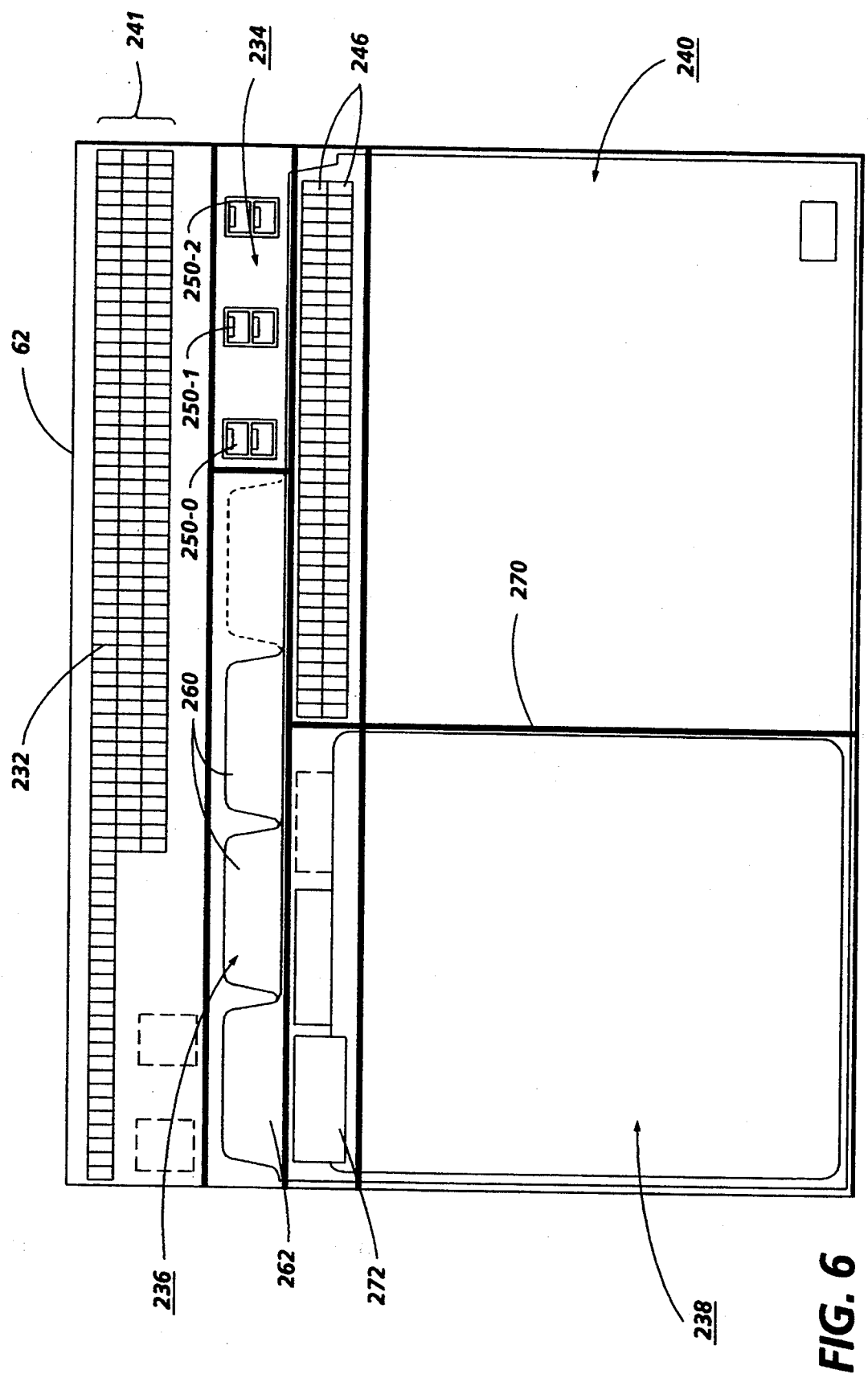
Figure 7:
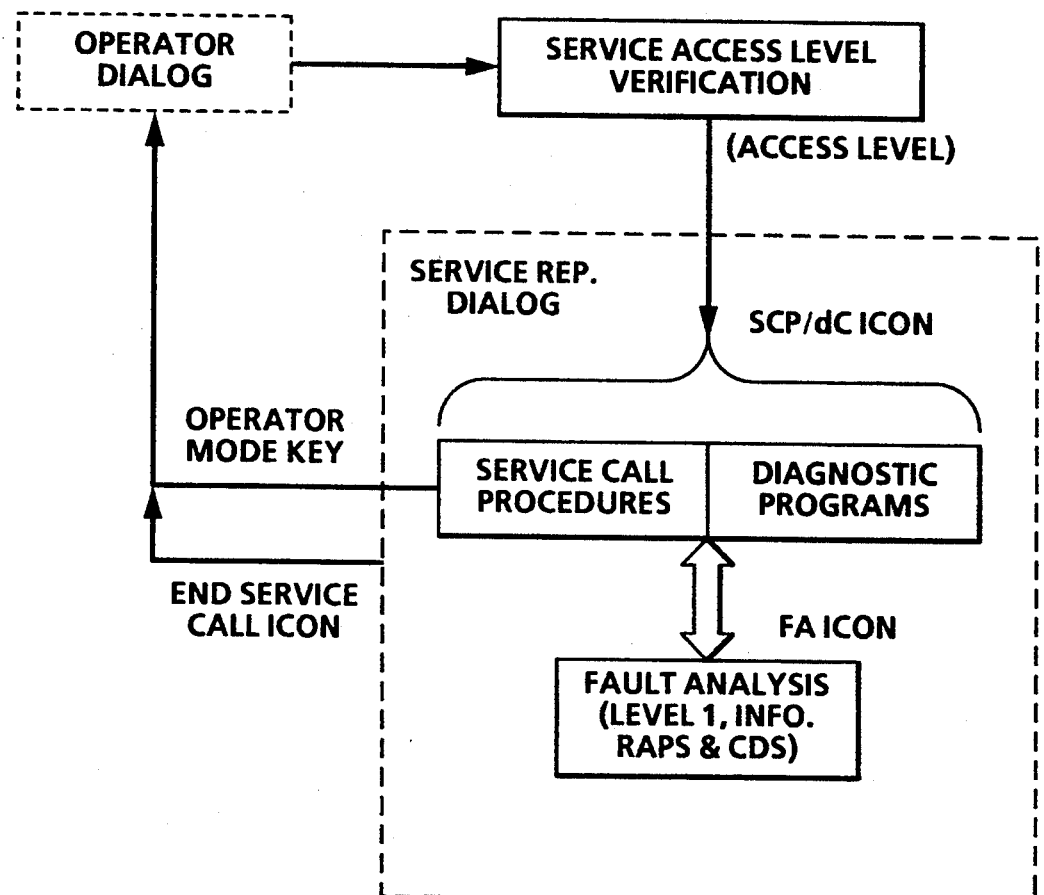
Figure 8:
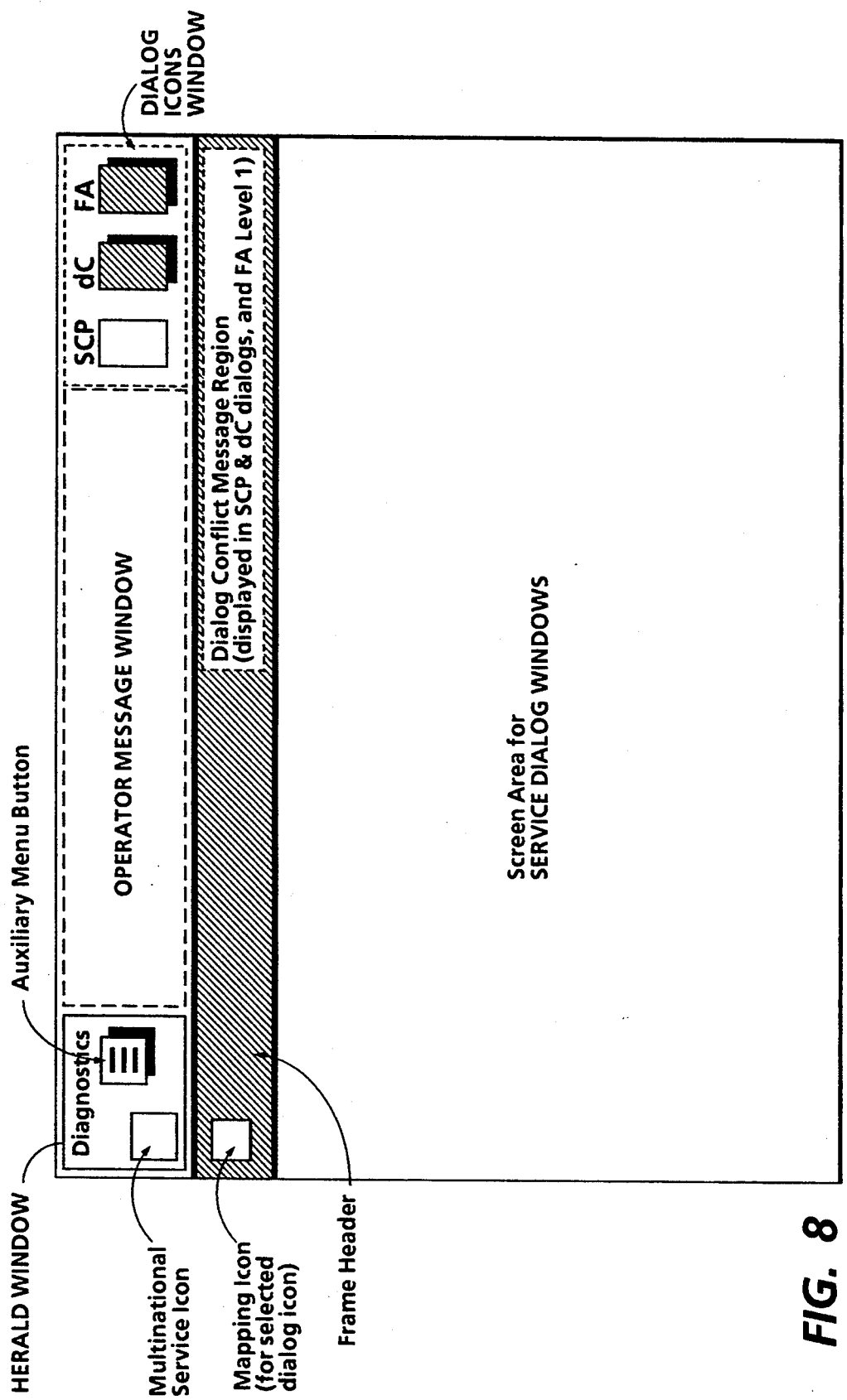
Figure 9:
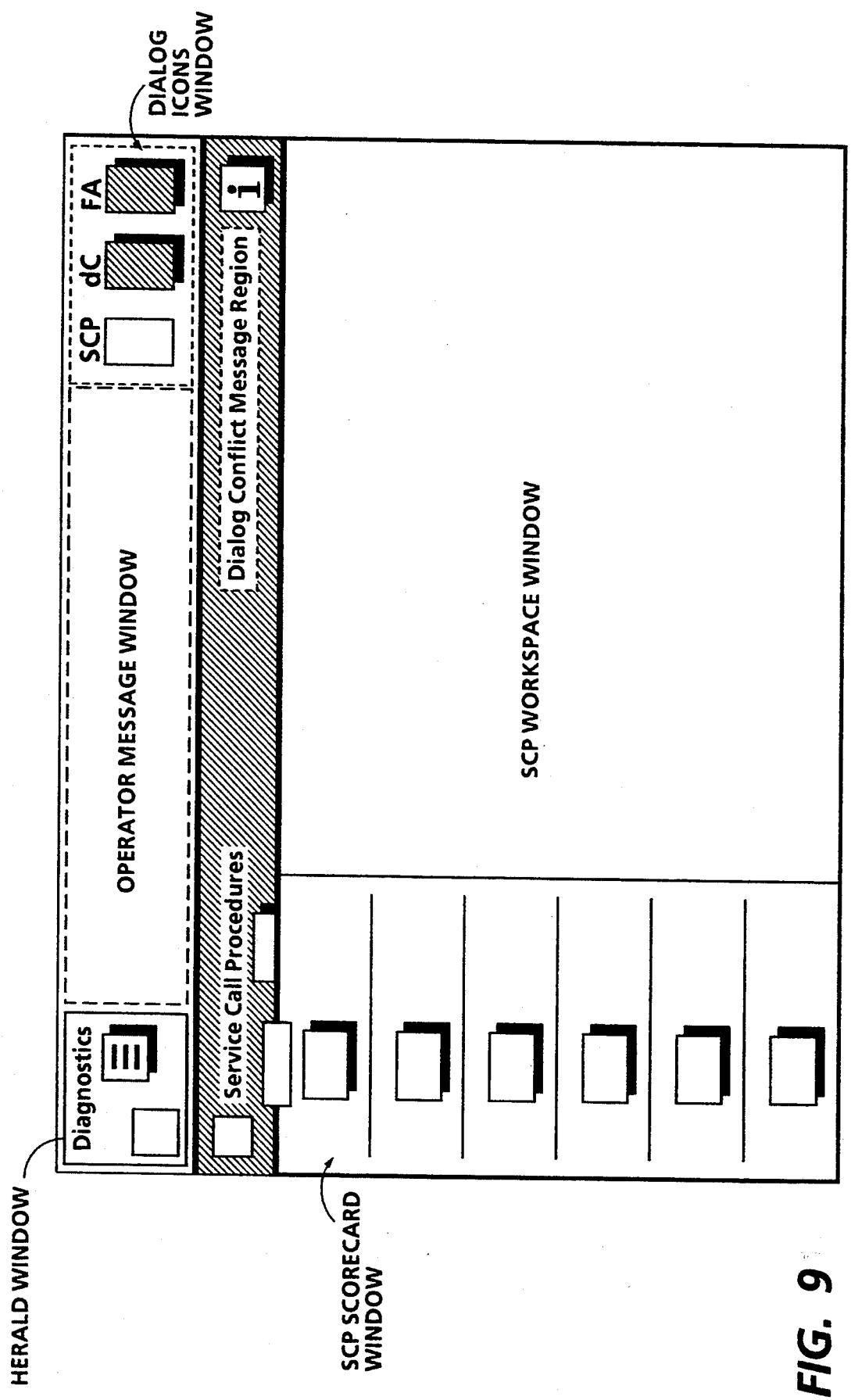
Figure 10:
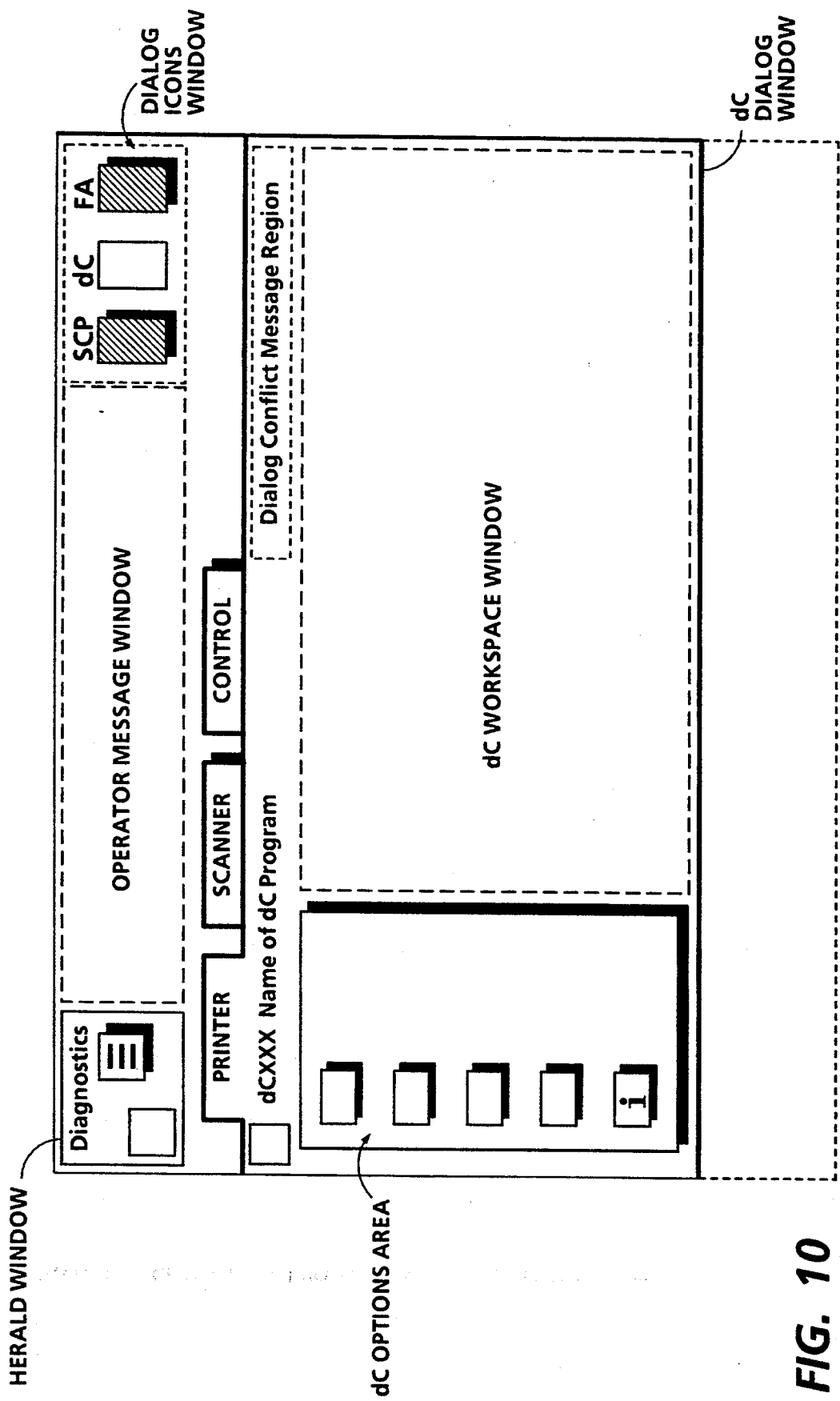
Figure 11:
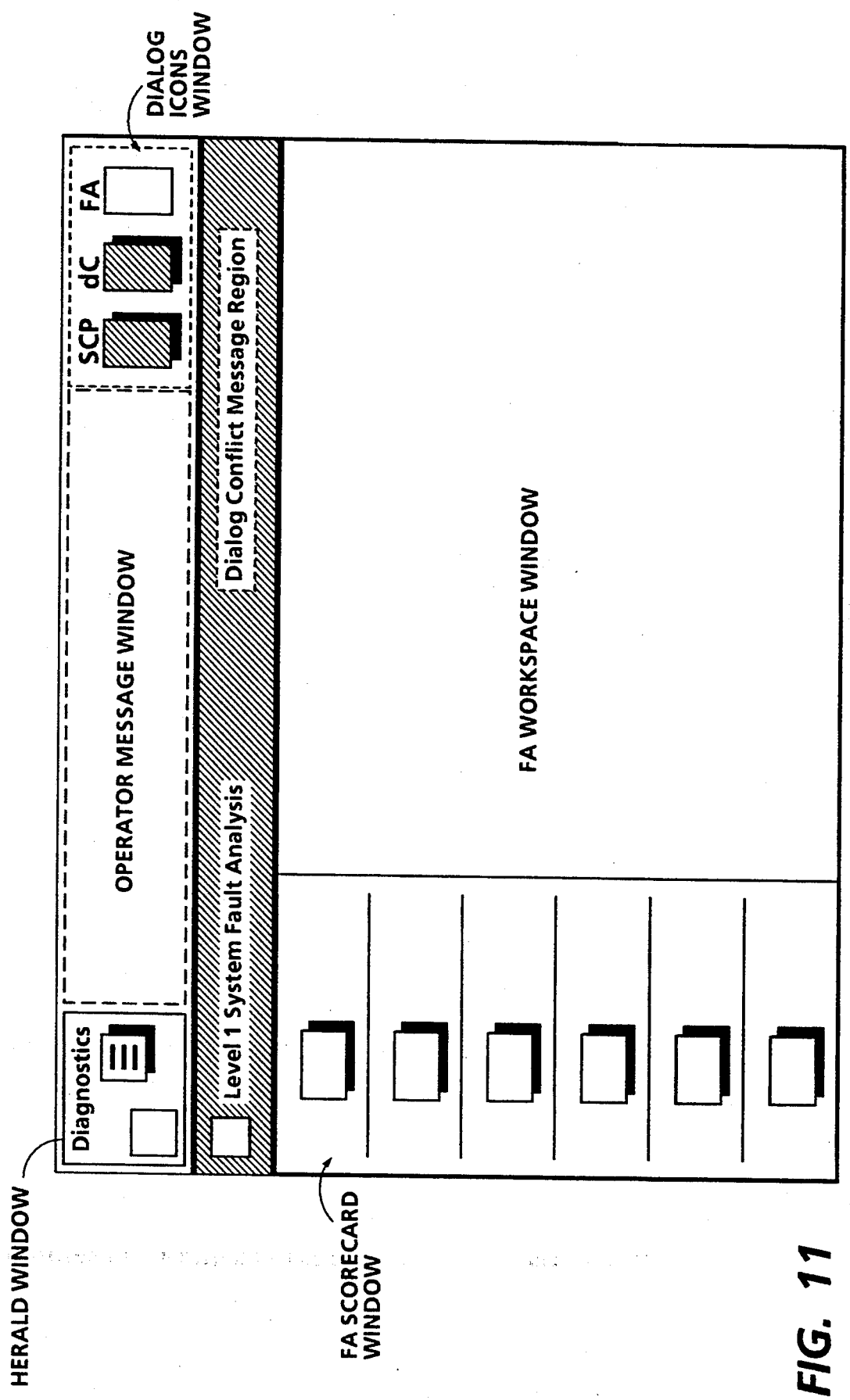
Figure 12:
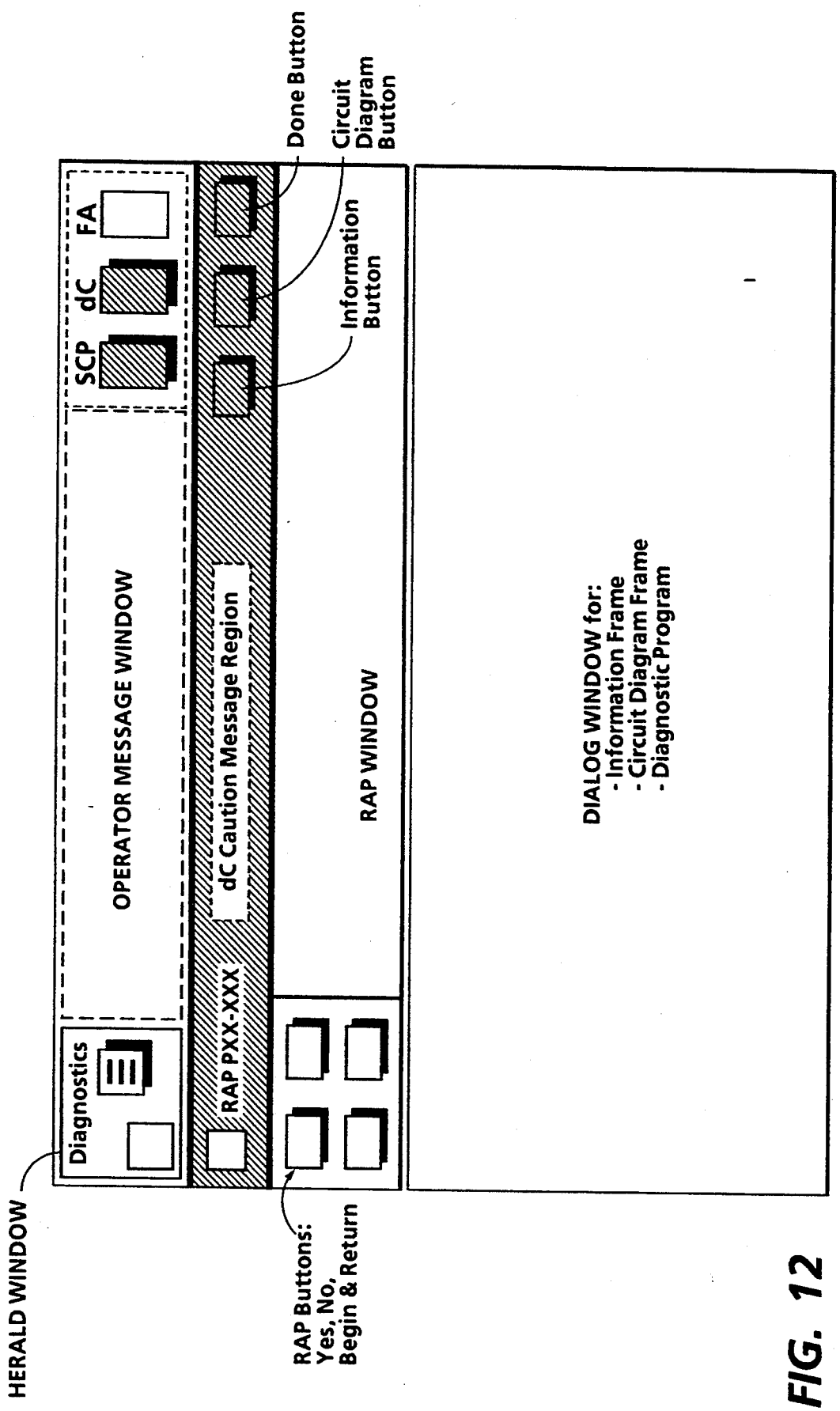
Figure 13:
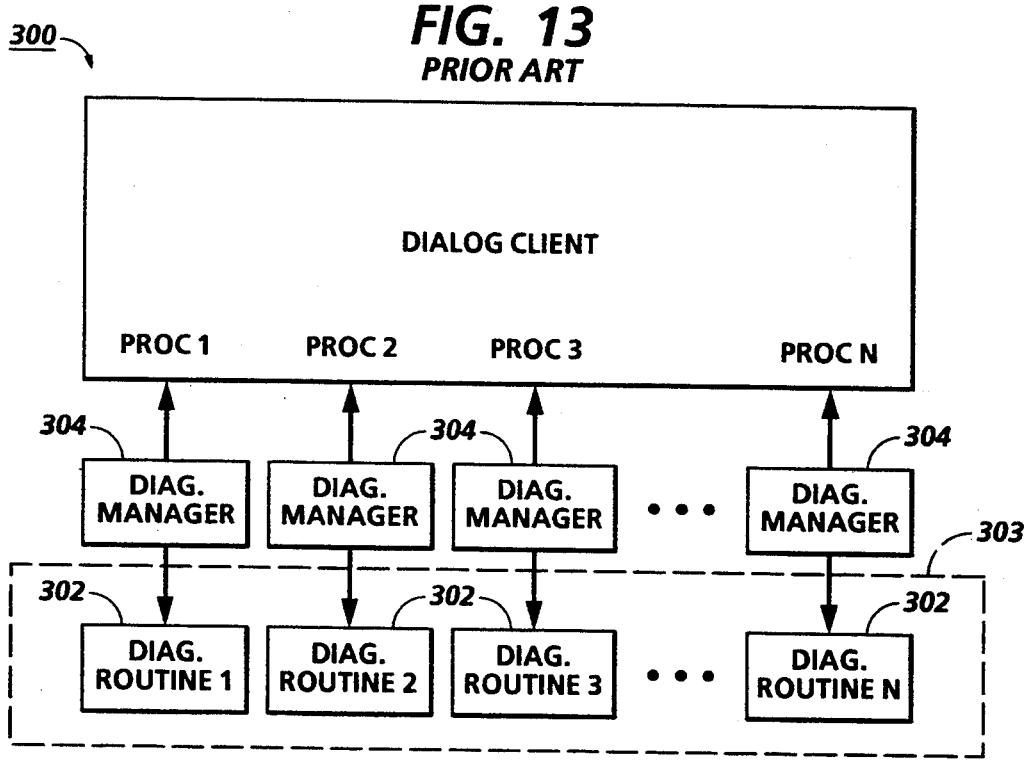
Figure 14:
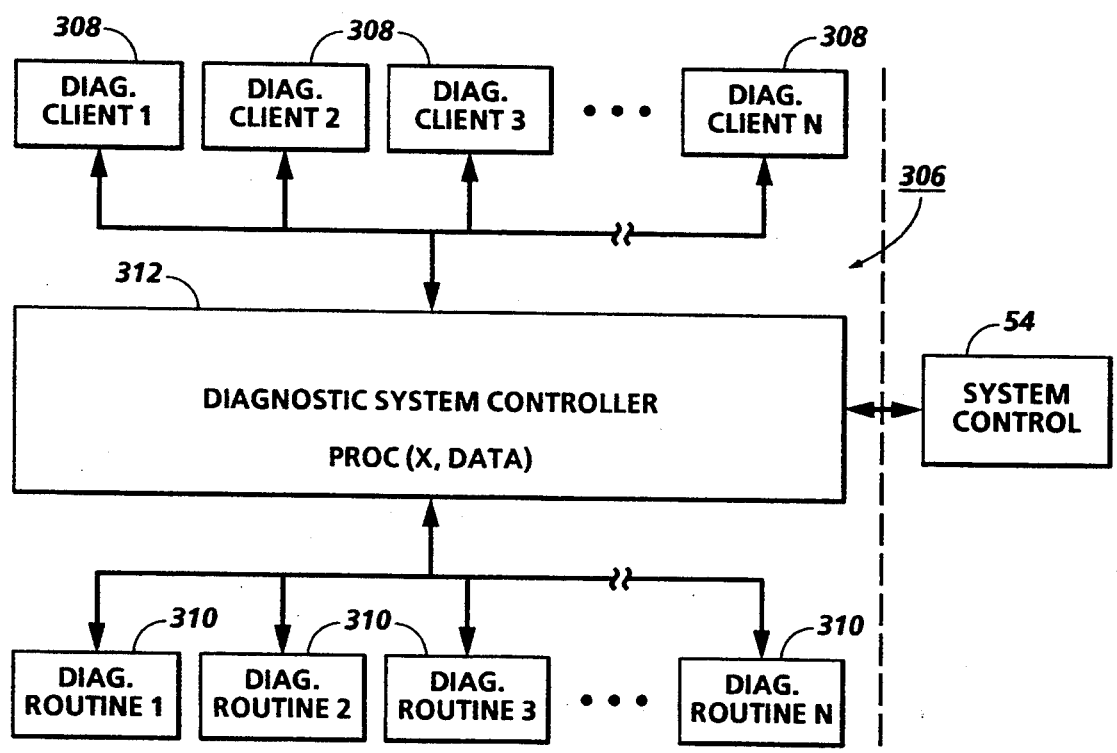
Figure 15:
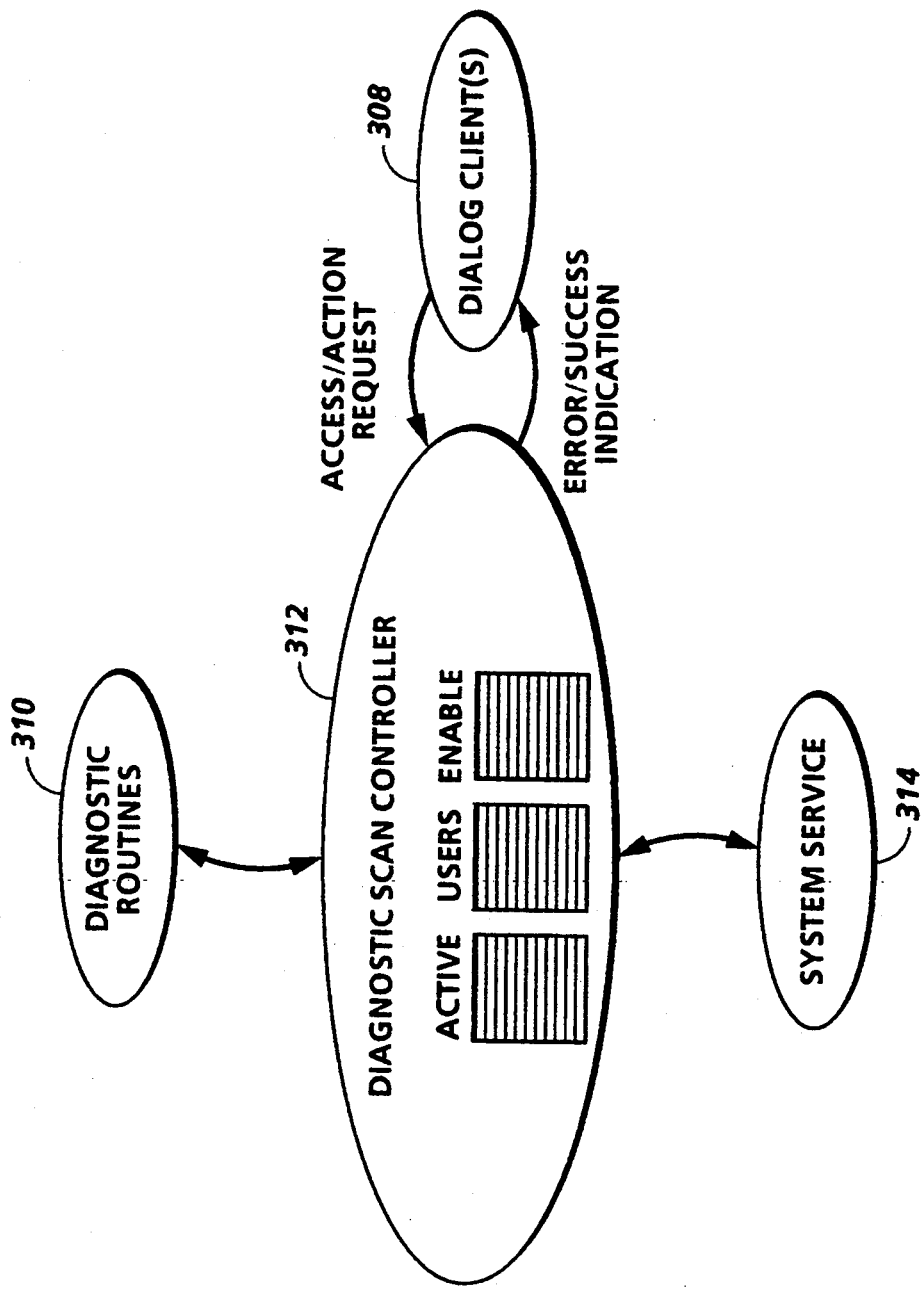
Figure 16:
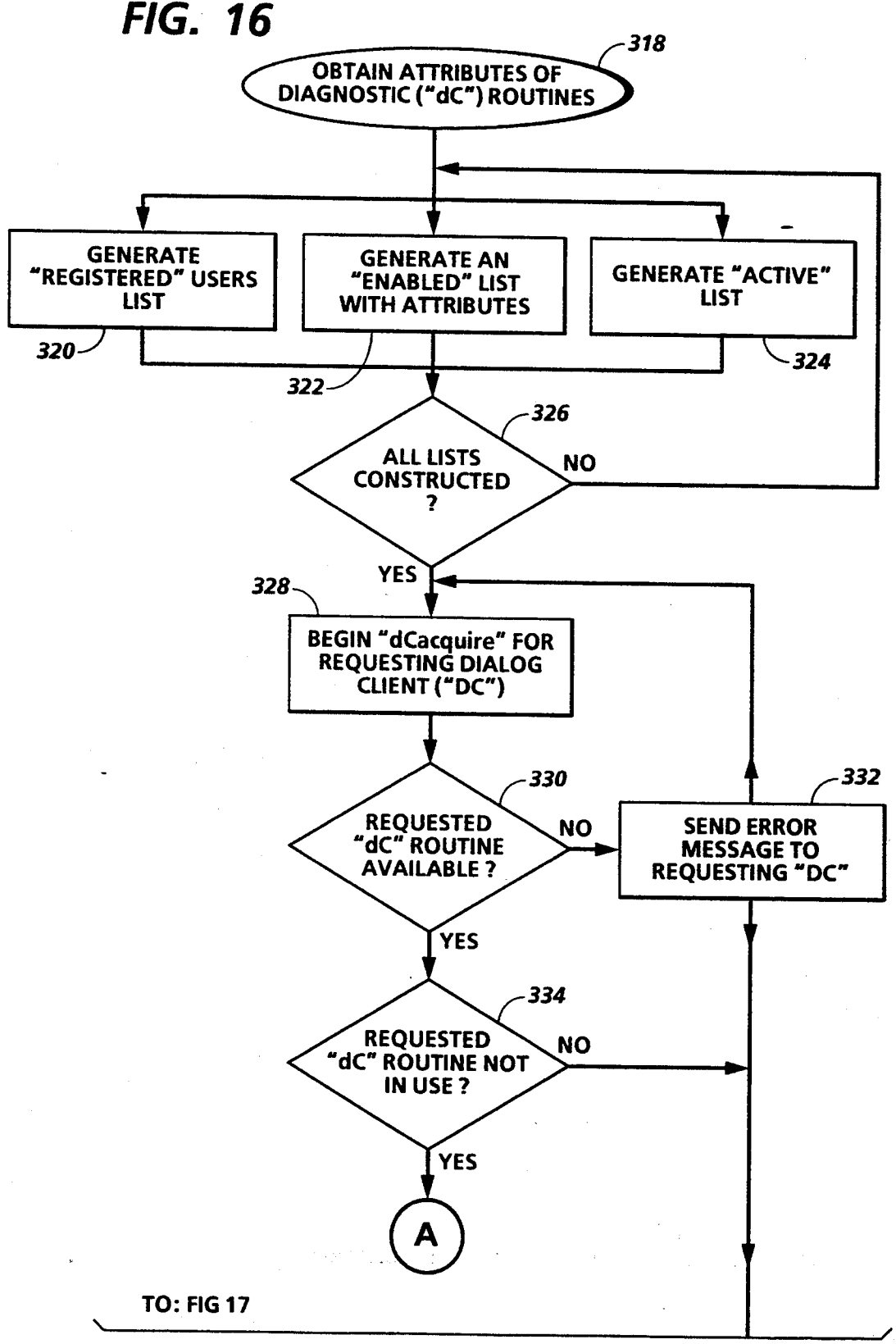
Figure 17:
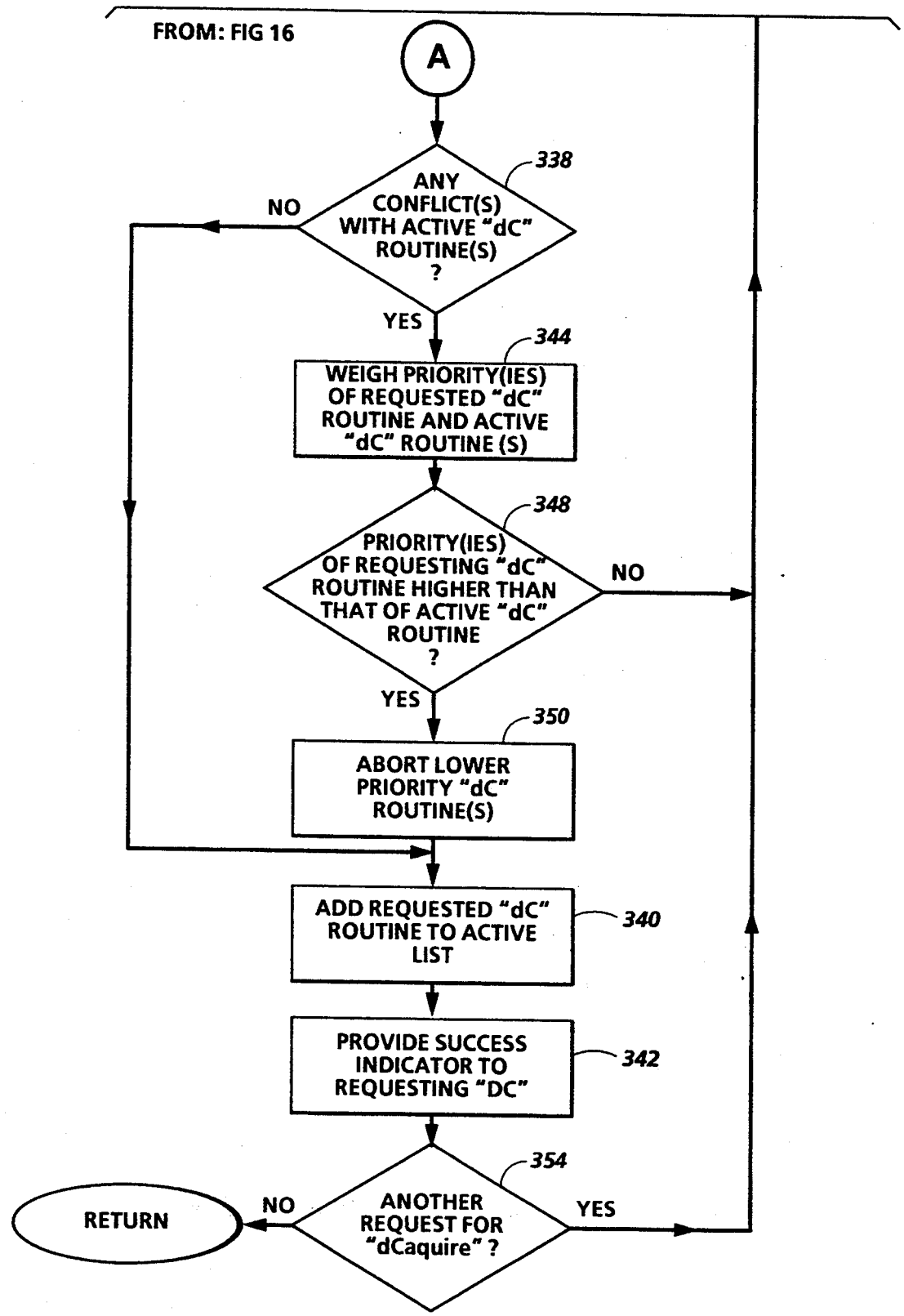
Figure 18:
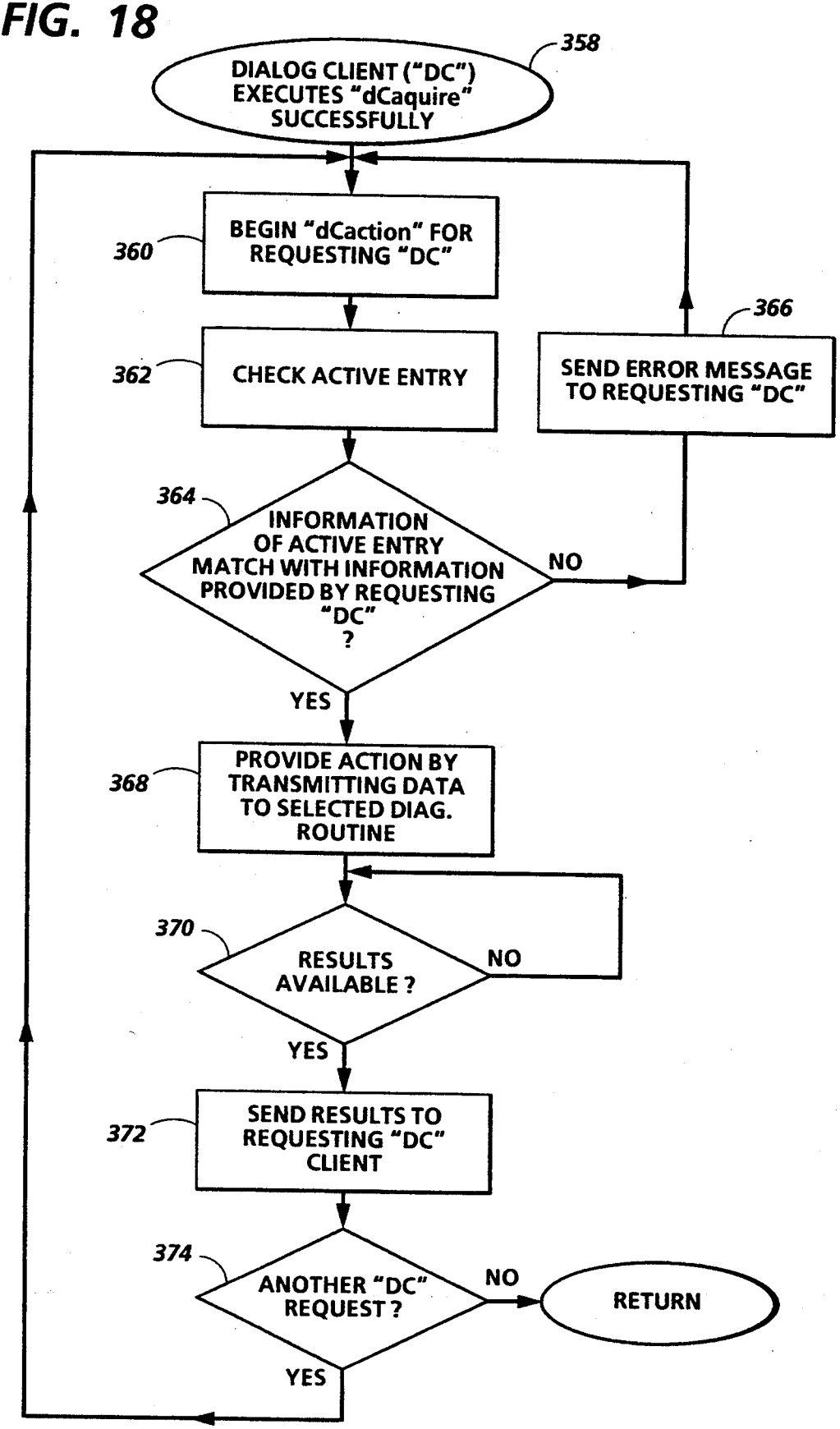

FIGS. 3–5 comprise a schematic block diagram showing the major parts of the control section for the printing system shown in FIG. 1;

FIG. 6 is an elevational view of a touch screen display which can be used to implement the present invention;

FIG. 7 is a schematic view depicting a top level structure of a service representative dialog and interconnection between dialog modules;

FIG. 8 is an elevational view of a touch screen display illustrating major areas of a service dialog system frame;

FIGS. 9–11 are elevational views illustrating a service call procedures dialog, diagnostic programs dialog and system fault analysis dialog, respectively, on a touch screen display;

FIG. 12 is an elevational view of the touch screen display of FIG. 8 shown in a fault analysis dialog;

FIG. 13 is a block diagram depicting a prior art diagnostic control system for a printing system;

FIG. 14 is a block diagram of a diagnostic control system embodying the present invention;

FIG. 15 is a schematic view illustrating various components and flow aspects of the diagnostic control system of FIG. 14;

FIGS. 16–17 is a flow diagram depicting a method used, by one or more dialog clients, to access the diagnostic control system of FIG. 14; and FIG. 18 is a flow diagram depicting a method used to initiate an action on a diagnostic routine in the diagnostic control system of Figure 14.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
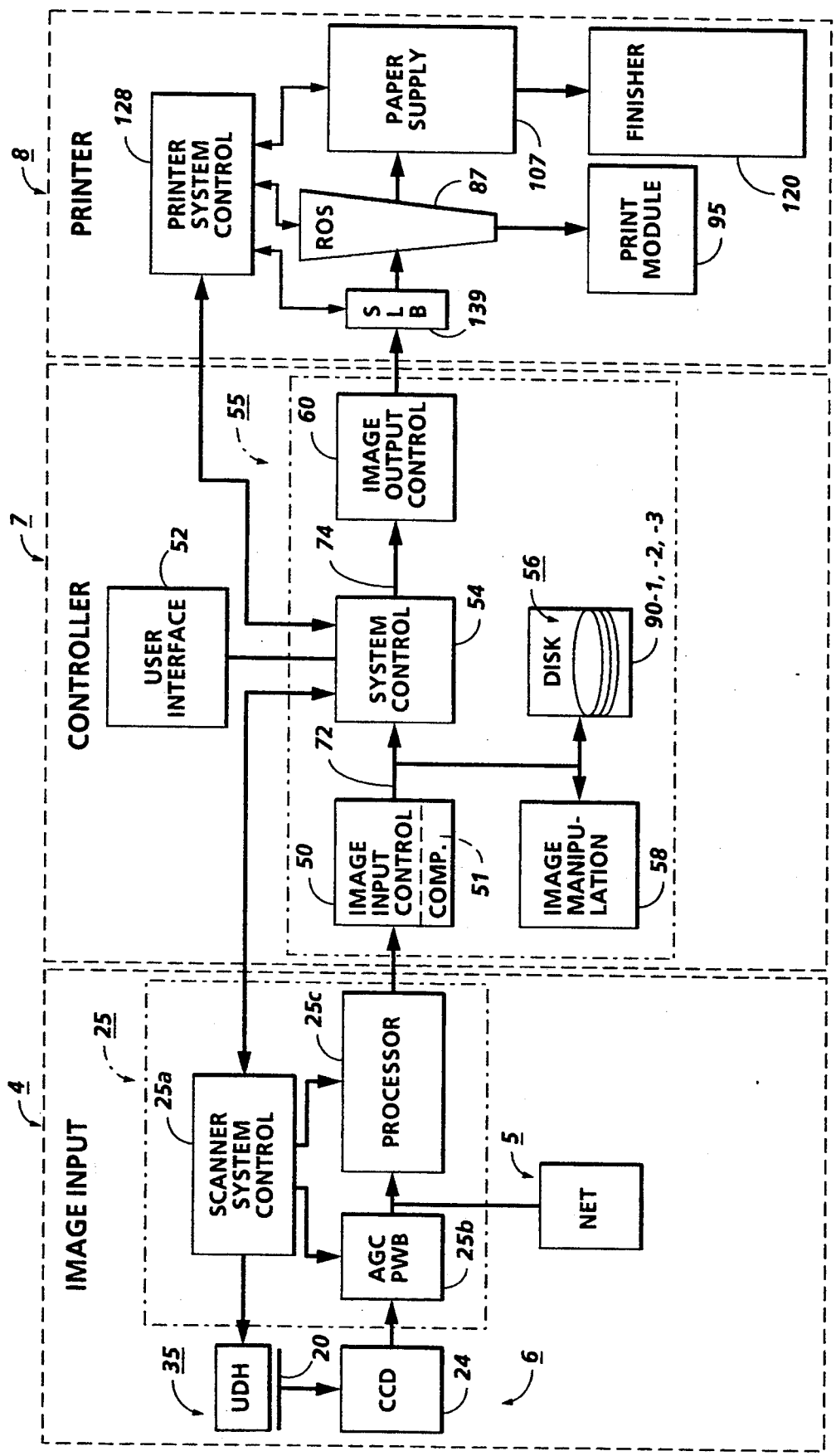
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet ® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. A detailed description of a print engine suitable for use with the present disclosed preferred embodiment is discussed in U.S. Pat. No.

5,170,340. It will be appreciated by those skilled in the art that other print engines, besides a laser-based print engine, could be used to implement the preferred embodiment of the present disclosure without affecting the concept upon which such disclosure is based. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor (not shown) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 706 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring now to FIG. 6, for user interface purposes, screen 62 is shown as being separated into five basic display areas, identified as a message area 232, a dialog mode selection area 234, a dialog pathway selection area 236, a score card selection area 238 and a work selection area 240. Available dialogs comprise a set of frames providing a certain level of technical support to an operator. Appropriate dialogs are chosen by interaction via the user interface 52. Further information regarding the screen 62 can be obtained by reference to U.S. Pat. No. 5,202,726, the pertinent portions of which are incorporated herein.

Message area 232 comprises three lines 241 located at the top of screen 62. Two programming conflict message lines 246 are provided in work selection area 240. The dialog mode selection area 234 comprises an active area containing certain top-level dialog mode controls available to the operator. The mode controls are soft touch buttons 250-0, 250-1, and 250-2 in the form of icons representing file cabinets located on the right side of the screen 220 directly below message area 232.

The dialog pathway selection area 236 and the score card 238 basically simulate a card with a card filing system with primary dialog file folders 260 and secondary file cards, the latter being referred to as score cards 270. Score cards 270 provide additional programming pathway options. File folders 260 and score cards 270 are arranged in overlaying relation, one in front of the other. The dialog pathway file folders 260, which are located beneath message area 232 and which extend up into the dialog mode area 234, each have an outwardly projecting touch tab 262 along with the top edge thereof identifying the dialog pathway represented by the folder. For purposes of the present invention, a file folder SERVICE will be described in greater detail hereinafter. To allow the file folders 260 to be distinguished from one another without the need to reshuffle the folders, it is desired to display a folder hidden behind the folder currently displayed, each tab 262 being offset from the other so that tabs 262 are always visible no matter what folder is displayed.

Score card selection area 238 appears in the lower left corner of screen 62 beneath dialog selection area 234 and extends to the border of work selection area 240. Score card selection area 238 contains a file of score cards 270 which present the features (first level program selections) available with each of the dialog pathway file folders 260. Two or three score cards 270 are typically provided, depending on the dialog pathway file folder 260 selected. Score cards 270 each comprise a relatively small file card arranged in overlaying relation to one another so as to simulate a second but smaller card file. Each score card 270 has a touch tab 272 displaying the programming pathway options available with the score card. Score card tabs 272 are also offset from one another to enable the identity of each score card to be determined no matter what its position is in the score card file. Additionally, score card tabs 272 are shaped differently from the dialog pathway file folder tabs 262 to prevent confusion.

Work selection 240 appears in the lower right portion of screen 62, work selection area 240 being beneath the dialog pathway area 236 and extending from the edge of score card selection area 238 to the right side of screen 62. The top two lines 246 of the work selection area 240 are reserved for programming conflicts and prompts with the remaining area being used for displaying the feature options (second level program selections) available with the first level program selection that is touched on the score card currently selected. The operator can thus scan and make a selection within a work area or pick another score card item.

The dialogs, accessible with the user interface 52, contain diagnostic information used for a variety of purposes such as: 1) assisting in the isolation of the current problem; 2) recording the performance history; and 3) indicating potential future failures requiring preventive service actions. Machine usage can be tracked to permit analysis of machine feature utilization.

A dialog, e.g., a customer maintenance dialog, can be provided which includes service information, optional maintenance procedures, and operator diagnostic programs which assist an operator in maintaining the machine and preventing unnecessary service calls. A dialog, e.g., a service representative dialog, can be provided which includes service call procedural information, diagnostic programs and repair analysis procedures to assist a service representative in maintaining the machine. The service representative dialog can comprise three dialog modules: 1) service call procedures; 2) diagnostic programs; 3) fault analysis procedures.

The service call procedures dialog module can be provided to assist the service representative while performing maintenance on the system during the service call. The dialog module provides the service representative with all necessary machine fault and history data to organize maintenance activities and identify machine areas requiring attention. The diagnostic programs dialog module enables access to diagnostic programs which reside in the machine. This dialog enables the service representative to execute software diagnostic programs for the printer, scanner, user interface, and electronic subsystem. The diagnostic programs are designed to assist the service representative in diagnosing machine failures and adjusting the system to operating specifications.

The fault analysis dialog module is provided to assist the service representative during isolation of a problem to a failed component. This dialog module comprises a fault analysis entry frame which provides access to a specific repair analysis procedure. The repair analysis procedure is used in conjunction with an information frame, a circuit diagram frame or the diagnostic programs dialog module. The repair analysis procedure presents step-by-step instructions which direct the service representative's fault analysis activity. However, if the service representative is performing fault analysis within the repair analysis procedure dialog, the service representative can independently access functional information within the circuit diagram to determine how the function being checked operates or access the diagnostic programs dialog module to run a diagnostic routine.

Access to each of the three dialog modules is provided using the screen-sensitive dialog icons displayed at the top of the service dialog system frame at all times. FIG. 7 depicts the top level structure of the service representative dialog and the interconnection between the dialog modules.

The service representative dialog frame structure comprises one service dialog system frame which controls the behavior of the dialog windows for the service call procedure, diagnostic program and fault analysis procedure dialog modules. The service dialog system frame represents the total viewing area on the screen. As illustrated in FIG. 8, the system frame is comprised of four major areas: 1) service dialog windows; 2) operator message windows; 3) dialog icons windows; and 4) herald window.

In order to provide the appropriate technical information for the service representative, the service dialog window area uses some form of the score card/work space design for all of the service dialog modules. This window area also contains a dialog conflict message region to display messages when a status or conflict condition occurs during the operation of a diagnostic program or when a dialog feature is selected.

In order to provide system feedback to the service representative during use of the service representative dialog, the operator message window is displayed at the top of the screen at all times. This window region will display operator messages, system status and fault information.

In order to provide access to each of the service representative dialog modules at all times, three screen sensitive icons (one for each dialog module) are displayed in a dialog icons window at the top of the screen. When one of the dialog icons is selected, the dialog that is currently displayed in the targeted window is closed or "put-away" and the new dialog is displayed in its appropriate window.

In order to indicate to the service representative that the representative is in the service diagnostics mode, the herald window will display a service icon. The herald window will also contain an auxiliary menu button which will provide access to selections such as: touch enable/disable, printer power on/off, scanner power on/off and system power off. FIGS. 9–11 illustrate the service call procedures dialog, diagnostic programs dialog and system fault analysis dialog, respectively.

In the fault analysis dialog, as illustrated in FIG. 12, there are two dialog windows—a repair analysis procedure window and an information/circuit diagram/diagnostic program window. The repair analysis procedure window will display the appropriate fault isolation instructions for each major fault code condition that can exist in the system. The information/circuit diagram/diagnostic program window will initially display the appropriate information frame for the repair analysis procedure. If the service representative selects the circuit diagram button, this window will be updated to display the appropriate schematic diagram of the faulty machine area. If the service representative selects the diagnostic (dC) icon, this window will display the appropriate diagnostic program frame. The determination of which diagnostic program frame is displayed and a particular node of the repair analysis procedure will be predetermined based on the task that must be performed for the node.

Further details regarding the operation of and the features offered by the service representative dialog described above can be obtained by reference to U.S. Pat. No. 5,202,726.

Referring to FIG. 13, a prior art arrangement of a diagnostic control system is designated with the numeral 300. The system 300 includes a dialog or diagnostic client, such as the user interface 52 (FIGS. 1 and 2), which is operatively coupled with a plurality of diagnostic programs or routines 302. Preferably, the diagnostic routines are contained in a file designated by the numeral 303. Each of the diagnostic routines is interfaced with one of the dialog clients through use of a diagnostic manager 304, each of which diagnostic managers performs basic request conversions. As shown in the illustrated embodiment of FIG. 13, N unique procedure calls (Proc (i)) are used to link the dialog client with each of the N diagnostic routines. Additionally, each time a diagnostic routine 302 is added to the system 300, recompilation of all of the routines in the file 303 is required. As can be envisioned, for an extensive system 300 with many routines 302, many procedure calls must be written and stored. Moreover, for extensive systems in which a routine is added, recompilation can be time-consuming.

Referring to FIG. 14, an improved diagnostic control system is designated by the numeral 306. As will appear, the diagnostic control system 306 minimizes the number of procedure calls employed and the amount of time required for recompilation. The system 306 includes a plurality of dialog or diagnostic clients 308 coupled with a plurality of diagnostic routines 310 by way of a diagnostic system controller 312. In the preferred embodiment, the dialog client can include a local dialog client, such as the user interface 52 (FIG. 2) or a remote client (not shown) communicating with the printing system by way of a network connection. Additionally, in the illustrated embodiment of FIG. 14, the controller 312 is shown as being separate from the controller 7; however, in another contemplated embodiment, the diagnostic system controller 312 could be integrated with the system controller without affecting the concept upon which the disclosed embodiment is based. For ease of explanation, the system of FIG. 14 is shown as a diagram in FIG. 15 in which the diagnostic controller 312 is shown in relation to a module 314 referred to as "System Services". Essentially, the module 314 represents services, such as scan service 6 and the print service 8, which serve as resources for the diagnostic control system 306.

In operating the diagnostic control system 306, each dialog client 308 accesses the diagnostic routines 310 by way of a control routine referred to as "dCAcquire" and executes the accessed diagnostic routine with a control routine referred to as "dCAction". Preferably, each of the control routines, the details of which are discussed below resides in the diagnostic system controller 312. Referring conjunctively to FIGS. 15–17, the dCAcquire routine is discussed in further detail. Initially, the controller 312, at step 318 (FIG. 16), obtains attributes of the diagnostic ("dC") routines by accessing the diagnostic routines 310. In the meantime, information regarding users who can access the diagnostic control system 306 ("registered users") is communicated from the dialog client(s) to the controller 312. The information regarding registered users may include the degree to which each registered user can access and/or employ the diagnostic routines. With the information from the diagnostic routines and the dialog client(s), the controller 312 generates a registered users list and an enabled list (steps 320 and 322), the enabled list indicating the various diagnostic features/functions available to the registered users. Another list, referred to as the "Active" list is generated at step 324 to indicate which of the diagnostic routines are currently in use. As follows from the discussion below, the Active list, which is empty at initialization, fills up as requests are made by dialog clients to use the diagnostic routines.

Once the lists are generated by the controller 312 (step 326), access requests from the dialog client(s) 302 are considered. Upon receiving a request (step 328), the controller 312 initiates the dCAcquire routine. In determining whether one or more dialog clients can access the diagnostic control system, the controller considers the answers to three major questions:

First, at step 330, the controller determines if the requested dC routine is available by traversing the enabled list. If the requested dC routine is not found in the enabled list, then the controller 312 returns an error message (step 332) to the dialog client which has made the request for the unavailable dC routine, and the process returns to step 328 for another request of dCAcquire. It will appreciated by those skilled in the art that a step for logging out of Service Representative Dialog automatically (not shown) is contemplated by the implementation of FIGS. 16–18 for those situations in which a dCAcquire or dCAction request cannot executed within a predetermined time period.

Second, assuming the requested dC routine is available, the controller 312 determines, via step 334, whether the requested dC routine is being used by traversing the active list. If the requested dC routine is in the active list, i.e. the requested dC routine is in use, then the error message 332 is sent to the requesting dialog client and the process returns to step 328 for another request.

Third, assuming that the requested dC routine is not in the active list, a conflict determination/resolution subroutine is executed. In particular, the controller 312 examines, at step 338 (FIG. 17), the diagnostic routines in the active list to determine if any of the functions to be executed by the requested dC routine conflict with any of the functions being executed by the currently operating dC routines. In one example, a conflict may arise between a requested dC routine and a currently operating dC routine because both routines desire to use the same resource, such as the IOT. If no conflict exists, then the process proceeds to step 340 where the requested dC routine is added to the active list and to step 342 where a success indicator (FIG. 15) is provided by the controller 312 to the requesting dialog client.

In the preferred embodiment, each dC routine is provided with one or more attributes which indicate the priority of that particular dC routine relative to other available dC routines. Assuming a conflict exists between a requested dC routine and one or more active dC routines, the controller, in step 344, weighs the various priorities. If the priority of the requesting dC routine is lower than the priority(ies) of the active dC routine(s) (step 348) with which the requesting dC routine conflicts, then an error message issues (step 332) and the process returns to step 338 for the handling another dC routine request. If, however, the priority of the requesting dC routine is higher than the priority(ies) of the active dC routine(s) with which the requesting dC routine conflicts, the lower priority dC routine(s), in one preferred approach, is aborted (step 350) and the requested dC routine is added to the active list (step 340). In an alternative approach, the dC routine requester, whose routine has a higher priority than that of any conflicting active dC routine(s), would be given the option to abort the conflicting active routine(s) or withdraw its request.

If the answer to the decision state 338 is negative or the answer to the decision state 348 is affirmative, then a success indication is provided to the requesting dialog client (step 352) and the controller, at step 354, looks for another request from a dialog client. If a request is present, the process returns to step 328 where dCAcquire is executed again; otherwise, as illustrated in FIG. 7, the dialog of the printing system shifts from Service Representative Dialog to Operator Dialog so that normal image-related processing operations can be performed.

Referring to FIG. 18, the dCAction control routine is discussed in further detail. Once a requesting dialog client executes dCAcquire successfully (step 358), the dCAction routine is commenced (step 360). It will be appreciated by those skilled in the art that while the methods of performing dCAcquire and dCAction are shown and discussed as if they were executed sequentially, typically, they will, in great part, be performed in parallel. To initiate dCAction, a given dialog client transmits a procedure call to the diagnostic system controller 312. The form of the procedure call, which is the same for each dialog client, follows the following format:

ProcCall (Caller I. D., Routine, Action, Data for Action)

In one example the Caller I. D., which is unique to each dialog client, corresponds with the user interface 52, while the routine and action are "dC131" and "write NVM", respectively. With the information regarding Caller I. D. and Routine, the controller checks the entries of the active list (step 362) (also see FIG. 15) to determine if the information of the procedure call matches the information of one of the active list entries. Referring to step 364, if the information of the procedure call does not match one of the active list entries, then an error message is transmitted to the corresponding requesting dialog client 308 (step 366) and the requesting dialog client is given another chance to execute dCAction at step 360.

If, on the other hand the information of the procedure call does match the information in one of the active list entries, then the process proceeds to step 368 where the requested action is initiated by routing the action request and any necessary data, with the controller 312, to the routine designated by the requesting dialog client. In the above example, the diagnostic system controller transmits the data to the routine known as dC 131 and, in accordance with the action component of the procedure call, the data is written to NVM. Once the action is performed at the routine level (step 370), an indication of results, which may include, among other things, a message indicating that the requested action has been performed or further developed data (e.g. data read from memory), is transmitted to the controller 312 in the following form:

Update (Results, Routine)

With the routine indication, the controller determines the corresponding Caller I. D. in the active list, and the controller 312 accesses the registered users list to determine the address which corresponds with that Caller I. D. This address is then used to route the results (step 372) to the appropriate requesting dialog client 308. It should be appreciated that the disclosed technique contemplates a situation in which a single dialog client seeks and receives multiple sets of results from respective multiple routines through use of a single request. Following step 372, the controller 312, detects, at step 374, whether another dCAction request is being made by a dialog client. If so, the process returns to step 360, otherwise a state transition is made from the Service Representative Dialog to the Operator Dialog.

Numerous features of the above-described diagnostic control system will be appreciated by those skilled in the art:

One feature of the disclosed control system is that one more or more clients have access to a diagnostic utility, including a controller coupled with a file of diagnostic routines, for performing multiple diagnostic operations, such as diagnostic set-up routines, in parallel. At the same time, the diagnostic utility is provided with a high level of control so that the routines are accessed and used in an orderly manner. For instance, the controller is adapted to resolve any conflicts that might arise among active diagnostic routines.

Another feature of the disclosed control system is that multiple clients can access and use the diagnostic utility concurrently. The utility is implemented so that system operation does not vary as a function of the number of clients accessing and using the diagnostic routines. Preferably, the control system is used in conjunction with a reproduction machine where the clients are either local (i.e. coupled directly with the reproduction machine) or remote (e.g. coupled with the reproduction machine by way of a network connection).

Yet another feature of the disclosed control system is in the provision of improved, generic procedure calls which serve to minimize the complexity of the software required to operate the diagnostic utility. That is, through use of these procedure calls, much of the code used by each diagnostic routine can be eliminated and replaced with a message handling utility which is generic enough to support all of the routines' needs. Moreover, the procedure calls facilitate routing of data/results between the client(s) and the diagnostic routine(s).

Another feature of the disclosed control system is in the provision of flexibility which permits a high degree of scalability. More particularly, the control system possesses an open architecture permitting both user interface and diagnostic software to be developed in a "plug and play" manner, thereby reducing internal development costs. Since the diagnostic routines are maintained in one file, as part of the diagnostic utility, only a minimum amount of recompilation is required whenever a diagnostic routine is added to the utility.

What is claimed is:

1. A printing system with a first service and a second service, the first service and the second service being controlled by a system controller, the first service and the second service being activated selectively by the system controller in a first mode, comprising:
   a diagnostic subsystem including a first diagnostic routine for performing a diagnostic function relative to the first service and a second diagnostic routine for performing a diagnostic function relative to the second service; and
   a diagnostic controller, communicating with the system controller and being activated selectively by the system controller in a second mode, the first diagnostic routine and the second diagnostic routine being activated, for concurrent operation thereof, when said diagnostic controller determines that a preselected condition has been met.

2. The printing system of claim 1, wherein the first diagnostic routine and the second diagnostic routine are activated, for sequential operation thereof, when said diagnostic controller determines that a second preselected condition has been met.

3. The printing system of claim 1, further comprising a first dialog client and a second dialog client, both of which communicate with said diagnostic controller, wherein activation of the first diagnostic routine and the second diagnostic routine occurs when the preselected condition is met and said diagnostic system controller has received respective request signals from said first [diagnostic]dialog client and said second dialog client.

4. The printing system of claim 3, wherein the printing system includes a reproduction machine with both of said first dialog client and said second dialog client being operatively coupled with said reproduction machine.

5. The printing system of claim 3, wherein the printing system includes a reproduction machine with one of said first dialog client and said second dialog client being disposed remotely of the reproduction machine.

6. The printing system of claim 1, in which selected functions are executable with the first diagnostic routine and selected functions are executable with the second diagnostic routine, wherein the preselected condition is met if no conflict arises as a result of performing the selected functions of the first diagnostic routine concurrently with performing the selected functions of the second diagnostic routine.

7. The printing system of claim 6, in which the first diagnostic routine and the second diagnostic routine include priorities, respectively, wherein when it is determined that a conflict will arise, said diagnostic controller determines which one of the first diagnostic routine and the second diagnostic routine is to be executed first by comparing the priority of the first diagnostic routine with the priority of the second diagnostic routine.

8. A control system for diagnosing one or more malfunctions occurring within a printing system, comprising:
   a diagnostic system including a first diagnostic routine for performing a diagnostic function relative to the first service and a second diagnostic routine for performing a diagnostic function relative to the second service;
   a diagnostic controller being operatively coupled with the first diagnostic routine and the second diagnostic routine; and
   a first dialog client and a second dialog client, said first dialog client and said second dialog client being operatively coupled with said diagnostic controller, said diagnostic controller causing said first dialog client and said second dialog client to communicate concurrently with the first diagnostic routine and the second diagnostic routine when a preselected condition has been met.

9. The control system of claim 8, wherein said diagnostic controller causes said first dialog client and said second dialog client to communicate sequentially with the first diagnostic routine and the second diagnostic routine when a second preselected condition has been met.

10. The control system of claim 8, wherein the printing system includes a reproduction machine with both of said first dialog client and said second dialog client being operatively coupled with said reproduction machine.

11. The control system of claim 8, wherein the printing system includes a reproduction machine with said first diagnostic client and said second diagnostic client being disposed remotely of the reproduction machine.

12. The control system of claim 8, in which said first dialog client seeks access to the first diagnostic routine with a first procedure call, the first procedure call indicating both an identity of said first dialog client and information regarding a diagnostic routine to be accessed, and said second dialog client seeks access to the second diagnostic routine with a second procedure call, the second procedure call indicating both an identity of said second dialog client and information regarding a diagnostic routine to be accessed, wherein said diagnostic controller determines whether the preselected condition is met by reference to the first procedure call and the second procedure call.

13. The control system of claim 12, in which the first preselected condition is met, wherein:
   the first diagnostic routine is executed and information resulting from the execution thereof is transmitted to said first dialog client in view of the first procedure call; and
   the second diagnostic routine is executed and information resulting from the execution thereof is transmitted to said second dialog client in view of the second procedure call.

14. The control system of claim 12, in which said diagnostic controller maintains a list of information designating that said first dialog client possesses a right to access and execute the first dialog routine, wherein the preselected condition is met if the first procedure call corresponds with the information contained in the list.

15. The control system of claim 8, in which selected functions are executable with the first diagnostic routine and selected functions are executable with the second diagnostic routine, wherein the preselected condition is met if no conflict arises as a result of performing the selected functions of the first diagnostic routine concurrently with performing the selected functions of the second diagnostic routine.

16. The control system of claim 8, in which the first diagnostic routine and the second diagnostic routine include priorities, respectively, wherein, when it is determined that a conflict will arise, said diagnostic controller determines which one of the first diagnostic routine and the second diagnostic routine is to be executed by comparing the priority of the first diagnostic routine with the priority of the second diagnostic routine.

17. A method of controlling a diagnostic system including a first diagnostic routine and a second diagnostic routine, comprising the steps of:

transmitting a first request from a first dialog client to a diagnostic controller and a second request from a second dialog client to the diagnostic controller;

determining, with the diagnostic controller, whether a preselected condition is met; and communicating the first request to the first diagnostic routine and the second request to the second diagnostic routine, when the preselected condition is met, so that the first diagnostic routine and the second diagnostic routine are executed concurrently.

18. The method of claim 17, further comprising the steps of:

determining, with the diagnostic controller, whether a second preselected condition is met; and communicating the first request to the first diagnostic routine and the second request to the second diagnostic routine, when the preselected condition is met, in a manner that causes the first diagnostic routine and the second diagnostic routine to be executed sequentially.

19. The method of claim 17, in which the diagnostic system resides in a reproduction machine, further comprising the step of transmitting the first request from a location which is disposed remotely of the reproduction machine.

20. The method of claim 17, in which selected functions are executable with the first diagnostic routine and selected functions are executable with the second diagnostic routine, wherein said determining step includes determining whether a conflict will arise as a result of executing the first diagnostic routine and the second diagnostic routine concurrently.

21. The method of claim 20, in which each of the first diagnostic routine and the second diagnostic routine include priorities, respectively, wherein said determining step includes comparing the priority of the first diagnostic routine with the priority of the second diagnostic routine to resolve the conflict.

22. The method of claim 21, further comprising the step of gathering information regarding the first diagnostic routine and the second diagnostic routine, with the diagnostic controller, and performing said determining step with the gathered information.

23. The method of claim 17, further comprising the step of transmitting an error message to one of the first dialog client and the second dialog client when the preselected condition is not met.

* * * * *